3,306,837
GLASS ELECTRODE APPARATUS AND PROCESS FOR MAKING SAME
John H. Riseman, Cambridge, and Robert A. Wall, Wakefield, Mass., assignors to Corning Glass Works, Corning, N.Y., a corporation of New York
Filed May 9, 1963, Ser. No. 279,069
13 Claims. (Cl. 204—195)

This invention relates to electrochemical analytical devices, and particularly to new and improved glass electrode structures for the determination of ion concentrations, and methods for making such structures.

The use of glass electrode structures for determining and measuring concentrations of ions in solution is now commonplace. In one usual form, the glass electrode comprises a tube made, at least in part, of an ion-sensitive glass. Glasses preferentially sensitive to hydrogen ion, potassium ion, sodium ion and others are well known. The tube is sealed at one end so as to form an enclosure in which is disposed an electrolyte. The electrode also includes a lead or wire in contact with the electrolyte and intended to pick up any potential at the electrolyte. When the tube exterior is in contact with a solution containing ions to which it is sensitive, a charge will develop across the glass between the external solution and internal electrolyte in accordance with the ionic concentration. Essentially then, the glass electrode in contact with the solution constitutes a half-cell.

To measure a single electrode or half-cell potential, it is necessary to have another half-cell of known potential. Usual practice employs a calomel electrode with a "liquid-liquid" junction, i.e., a paste electrode of Hg/HgCl contacting a saturated KCl solution which in turn contacts the test solution. This provides a practically potential-free junction with a known half-cell voltage. A meter between the two electrodes completes the measuring circuit. The use of junctions, such as metal/solution, which develop potentials, is generally avoided because these potentials depend upon unknown ionic concentrations and tend to introduce spurious values into the circuit.

However, under certain circumstances, the liquid-liquid junction is not satisfactory. For example, if the sample in which ion-concentration is to be measured is blood, the presence of KCl will cause clotting. While some other liquid, such as physiological saline solution, will overcome the clotting problem, it will create an appreciable junction potential, presenting difficulties such as in obtaining proper calibration of the electrode. Where the measurement is in vivo, still further difficulties appear; over a period of time, the diffusion of blood across the liquid-liquid junction will create an additional source of error. The monitoring of ion-concentration in blood in vivo for any protracted period is most desirably done with micro electrodes (e.g., electrodes having at least in one plane, a cross-section dimension below about 20 mil inches) which can be easily and conveniently implanted and removed, and which insure a minimum of inconvenience to the functions of the viable subject during monitoring.

Electrodes requiring liquid-liquid junctions, pastes and the like, are exceedingly difficult to fabricate in such small dimensions. Particularly, if the internal electrolyte is normally a liquid, great difficulties are encountered in introducing the electrolyte into the sealed end of micro-tubing. Of particular importance is the desirability of localizing the ion-sensitive portion of a micro-electrode, a requirement which further compounds the difficulty of reducing conventional liquid-electrolyte type electrodes to micro-sizes.

It is accordingly an object of the present invention to provide novel and improved means and methods for determining ion-concentrations in solutions.

It is a further object of the present invention to provide novel and improved means for determining ion concentration with an electrode system wherein all the electrodes employ ion-sensitive glass membranes.

Other objects of the present invention are to provide a novel ion-sensitive glass micro-electrode; to provide methods of producing such a micro-electrode; and to provide a novel system of micro-electrodes, particularly adapted for prolonged and accurate monitoring of ion-concentration in biological fluids in vivo.

To achieve the foregoing and other objects, the present invention comprises an electrode assembly for determining the concentration of a first species of ion in an environment having a concentration of a second ionic species. The preferred environment is one in which the concentration of one of the species is substantially constant. The electrode assembly includes at least a first electrode comprising a glass membrane which is preferentially or selectively sensitive to the first species of ion, a second electrode comprising a membrane of glass which is preferentially or selectively sensitive to the second species of ion, and means for coupling the electrodes to a measuring device whereby potentials developed as a function of ion concentration may be determined.

In a preferred form of assembly, each glass electrode is formed according to the novel manufacturing processes of the invention so as to provide a carefully limited predetermined, i.e., localized, surface area thereof as the sole ion-sensitive portion of the electrode.

In electrodes formed according to the processes of the present invention, the reference electrolyte is formed as a substantially integral mass of solid, electrically conductive, fused material in intimate physical and electrical contact with the ion-sensitive surface area which is delineated by the electrolyte. Such material is selected from a group of materials which, inter alia, will allow electronic charge transfer between the mass and a metallic lead or wire with negligible polarization potential (i.e., a polarization E.M.F. which remains substantially constant over an extended time period, e.g., ±0.1 millivolt or less in ten hours), and will also permit ionic transfer across the interface between the electrolyte mass and the ion-sensitive glass, also with negligible polarization potential.

Other objects of the invention will in part by obvious and will in part appear hereinafter. The invention accordingly comprises the processes involving the several steps and the relation of one or more steps with respect to each of the others, and the apparatus possessing the construction, combination of elements and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Figure 1:
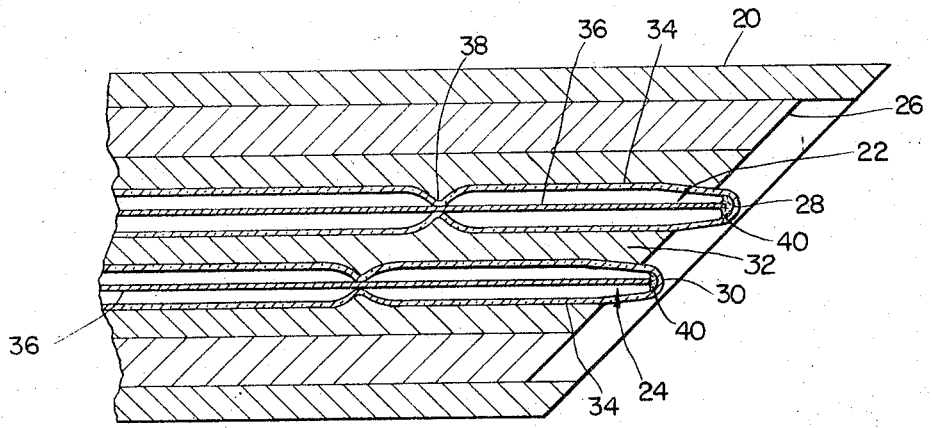
FIG. 1 is a schematic, cross-sectional representation partly in fragment of one embodiment of the present invention, certain dimensions being exaggerated for the sake of clarity.

Referring now to the drawing, there will be seen an embodiment of an exemplary electrode assembly formed according to the principles of the invention, which assembly is shown in FIG. 1 disposed within the cannula of a hypodermic needle 20, only the tip portion of the latter being shown. The electrode assembly comprises generally a first electrode 22 and second electrode 24 disposed within hollow, elongated, cylindrical tube 26. The outside diameter of the latter is preferably dimensioned to fit snugly but slidably within the cannula of needle 20. The inside diameter of tube 26 is dimensioned to accept readily the positioning of both electrodes 22 and 24 therein. Tube 26 may be made of metal, synthetic or natural polymers, glass or some other substantially rigid material which is also preferably chemically inert, at least to the environment solutions with which it is intended to be used. Electrode 22 and electrode 24 are both elongated elements having adjacent or at respective ends 28 and 30 thereof, membranes of ion-sensitive glasses. The two electrodes are disposed in side by side relation, i.e., with their long axes approximately parallel to one another, such that the sensitive ends thereof extend either flush with or slightly protruding from one open end of tube 26, and are supported in this relation to one another and to tube 26 by appropriate means such as potting compound 32. The latter, which is preferably also chemically inert to the expected environment, typically may be a rubbery material polymerized in situ, an epoxy cement or the like, and is adapted to serve a dual function of providing protective mechanical support for the fragile electrodes and also of providing a substantially moisture-proof, electrically-insulating barrier about each electrode. It will be apparent to those skilled in the art that tube 26 also aids in these functions. Consequently, whilst tube 26 forms a convenient mold into which potting compound can be placed so as to hold the electrodes in place, the tube itself is not necessary. A similar structure can readily be formed by potting the electrodes in a mold which exhibits the requisite dimensions, so that upon release of the potted electrodes from the mold, the structure thus formed will be appropriately shaped for the desired fit within the cannula of the hypodermic needle.

Inasmuch as electrodes 22 and 24 are virtually identical, with the exception of the type of glass employed to form the ion-sensitive portions thereof, only electrode 22 will be described in detail hereinafter, it being understood that a similar description is equally applicable with respect to electrode 24. Electrode 22 is formed as a substantially hollow, elongated element or tube 34 having at least one end thereof closed so as to form an enclosure. While tube 34 may be largely formed of a variety of materials, at least end 28 is an ion-sensitive membrane, preferably extremely thin (e.g., a fraction of a mil-inch), formed from one of a large number of known ion-sensitive glass compositions. For instance, end 28 may be a so-called lithia pH glass such as is described in U.S. Patent 2,462,843 issued March 1, 1949 to H. Carey et al.; a sodium ion-responsive glass as described in U.S. Patent No. 2,829,090 issued April 1, 1958, to G. Eisenman et al.; a potassium ion-responsive glass as described in U.S. Patent No. 3,041,252 issued June 26, 1962, to G. Eisenman et al., or any of a number of other varieties of ion-sensitive glass described in the literature. The embodiment of FIG. 1 also includes means for electrically coupling electrode 22 is a measuring device such as a high sensitivity voltmeter, typically an electronic voltmeter, a vibrating reed electrometer, a graphic recording device, or the like. Such means takes the form of a metallic, electrically conductive lead or wire 36 which is disposed interiorly of tube 34 and is preferably held therein with a hermetic seal, provided for example by constriction 38 at an intermediate portion of the electrode. Also disposed within the interior of tube 34 and in intimate physical and electrical contact with the interior surface of the membrane at end 28 is an integral, electrically conductive, normally solid, electrolytic mass 40, in which a portion of wire 36 is so embedded as to be also in intimate physical and electrical contact therewith.

Figure 2:
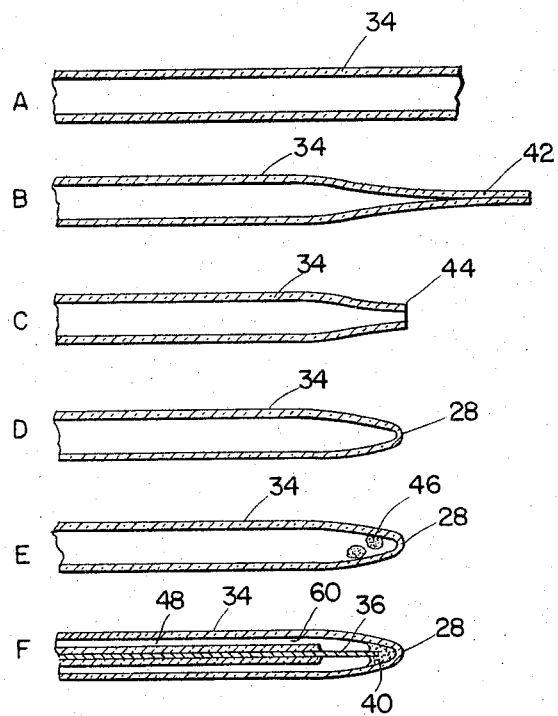
FIG. 2 is a schematic representation, partly fragmentary, of a cross-section of an electrode structure at various stages in a manufacturing process according to the present invention.

One process of forming an electrode of the type such as electrode 22 is illustrated in FIG. 2. As shown in FIG. 2A, a hollow tube 34 of an appropriate ion-sensitive glass is selected. For example, for micro-electrodes, the tube may be about 5 mils in exterior diameter. A platinum plate is heated to redness, and the end of the tube touched briefly to the plate, being then withdrawn rapidly in a direction along the axis of the tube. Because the tube walls are extremely thin, e.g., about ½ mil or less, the contact with the red hot platinum is sufficient, even in a very brief time such as a tenth second, to heat the glass to a working temperature. Consequently, upon withdrawal of the tube, the glass is elongated in the direction of motion, creating a long tapered end 42 to the tube such as is shown in FIG. 2B. The walls of tapered portion 42 of the tube thus formed, although tapering in thickness in accordance with the tapering of tube diameter can be considered to be of substantially uniform thickness. Part of the tapered portion of the tube is broken off, as with a pair of pliers or tweezers, at a point at which the exterior diameter of the tube has been reduced to one-half to one-third approximately of the original tube diameter, providing a shortened tapered portion 44 as shown in FIG. 2C. Upon passing the end of the tube as shown in FIG. 2C quite rapidly through a flame which is hot enough to melt the end of the tube, the walls of the tapered portion coalesce to form a seal such as is shown as end membrane 28 of the tube in FIG. 2D. This seal has the important characteristics that the end wall formed is an ion-sensitive, glass membrane of the order of thickness of or even thinner than the side walls of the original tube, and presents a substantially smooth, globular interior and exterior configuration to the end of the tube without having had to mold, blow, or otherwise shape the wall itself. The structure shown in FIG. 2D is attained therefore by a process which contrasts rather sharply with the prior methods for sealing micro-electrode tubes; such prior methods usually provide non-uniform wall thicknesses, typically in the form of a globule or droplet of solid material, which cannot be characterized as a membrane, disposed at the end of the tube.

In order to provide the requisite solid electrolytic mass 40, there is selected a normally solid (i.e. under standard conditions of temperature and pressure) substance which has a number of physical characteristics: it is electrically conductive as a solid; it is capable of being in a molten state within a temperature range at which the glass composition forming the end of the micro-electrode will be soft enough to allow for rearrangement of the silicon lattice thereof; it exhibits normally low, electrical bulk resistivity which is preferably at least an order of magnitude less than the bulk resistivity of the glass employed to form the sensitive portion of the micro-electrode; and it further possesses, in its solid state, a mobile cation having a diffusion coefficient preferably greater than the diffusion coefficient of the normally mobile ions of the glass composition forming the sensitive portion of the micro-electrode. The use of substances having cations of much lower mobility than the mobile ions of the glass will generally create an undesirably polarizable region between the solid material and the glass. Additionally, the material selected should be capable of forming an integral solid mass when cooled from the molten state, which mass will tenaciously adhere to or bond with the glass of tube 34 and wire 36. A typical example of such material is silver chloride, although a variety of other materials may be employed, e.g., silver bromide, thallium halides such as the chloride, and others.

The solid electrolytic material is, in one variation of the process, preferably placed in a comminuted state so that it can be introduced to the interior of the tube. The preferred manner for accomplishing this is to powder, for example, silver chloride, as by crushing the crystalline material in a mortar or ball mill. The powdered silver chloride is then dropped through a flame which is hot enough to fuse the silver chloride without substantially decomposing it. As the silver chloride powder is dropped through the flame, it fuses into minute globules. The use of such fused globules in the present invention is preferred over crushed or powdered silver chloride for several reasons. The configuration of the globules permits their introduction into a tube of minute interior cross-section with a minimum of difficulty. Interaction between the particles, themselves, as between the rough edges of powdered crystalline material, or between the particles and any surface irregularities on the inside surface of the tube, is minimized. Also, the quantity of the material employed can be carefully controlled and production time considerably reduced inasmuch as the shape of the globules allows them to be easily sorted into size ranges each of which represents a corresponding range of masses. Thus, weighing a quantity of material becomes merely a matter of counting.

A predetermined number of globules 46 of chosen dimension are then introduced into the open end of the microtube of FIG. 2D and are moved, as by gravity, into the sealed end as shown in FIG. 2E. To aid in positioning the globules adjacent end membrane 28 of the microtube, globules may be pushed toward the membrane with wire 36 itself. The latter, in the example chosen, is silver which has been reduced to appropriate diameter, as by the known process of providing the wire with glass coating 48, such as a borosilicate type glass, and then drawing the wire while the coating is soft enough to be worked. The wire may also be selected, for example, from one of the noble metals. The end of the coated wire which is intended to be adjacent the silver chloride globules can be freed of glass 48 at an earlier stage, as by stripping with hydrofluoric acid. Once the globules are positioned adjacent the end membrane of the tubule and micro-electrode wire 36 is positioned with its exposed end immediately adjacent the silver chloride globules, the tube is held vertically. Heat is then applied to the sealed end of the tube, as from an ordinary soldering iron, so as to liquefy the silver chloride without melting the glass, but preferably at a temperature at which the silica lattice of the membrane will yield to allow some diffusion of silver ions therein. The glass membrane and the silver chloride mass are held at the requisite temperature for a period of time considerably in excess of that required merely to melt the silver chloride, thereby insuring good formation of a glass-AgCl bond. The latter is believed to be formed as a transition region wherein the composition of the glass membrane and silver chloride are physically intermingled. Upon cooling, the molten silver chloride crystallizes into solid mass 40 which remains tentaciously in contact with both the glass membrane and the lead to form the essential structure of the completed electrode as shown in FIG. 2F.

Figure 3:
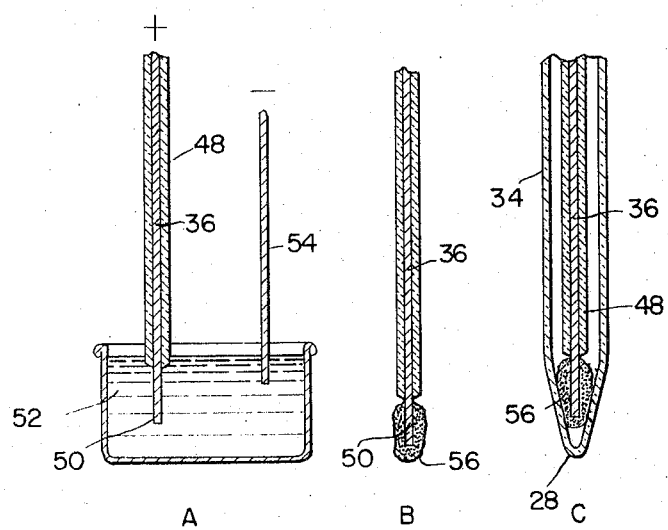
FIG. 3 is a schematic representation, partly in fragment, of a cross-section of an electrode structure at various stages in an alternative manufacturing process according to the present invention.

It will be appreciated that the manipulation of tiny, often microscopic, solid electrolyte globules is a delicate task. In another variation of the process of the present invention, the solid electrolytic material is introduced into the interior of the tube in a different manner. Broadly, the electrolytic material is prepared by chemically reacting the metallic, electrically conductive wire 36 with an appropriate substance. The reaction product is then inserted into the micro-tube while disposed upon or adherent to the remainder of the wire. Specifically, wire 36 is formed from an electrically conductive metal which can be oxidized to yield an appropriate salt which accords to the defined requirements for electrolytic mass 40. For example, wire 36 can be of silver and as hereinbefore described is encased in an appropriate glass 48 in which the wire has been previously drawn to its desired fineness. As shown in FIG. 3A, portion 50 of an end of wire 36 is free of glass, as by stripping.

Portion 50 is subjected to chemical treatment, preferably by electrolysis, although other known methods can be employed. Thus, as shown in FIG. 3A, wire 36 is first connected in a known manner in an electrical circuit (not shown) such that portion 50 constitutes an anode and is immersed in an electrolyte 52, such as a 1M NaCl solution. The passage of current through the circuit between cathode 54 and portion 50 will cause the silver to be oxidized to AgCl, the latter being formed as spongy mass 56 about portion 50 as shown in FIG. 3B. The choice of cathode material, voltage, time of immersion, temperature, and the like, are all parameters which are readily determined by those skilled in the art and which are dependent upon how much silver chloride it is desired to form from a given exposed amount of silver wire. It will be apparent that electrolytic formation of the AgCl is preferred because of the simplicity of the process and the accurate control achieved in determining the amount of silver chloride formed. Other processes, for example the exposure of metallic wire to a halogen atmosphere, may be less convenient or safe.

After an appropriate amount of solid electrolyte salt is formed by the oxidative process chosen, impurities can be removed. For instance, where the oxidative process is electrolytic and the salt formed is AgCl, undesired alkali halide can be removed by the simple process of leaching the virtually insoluble AgCl in distilled water. The wet salt is then air dried. Care should be taken in forming, leaching and drying the salt to avoid the separation of salt from the residual end of the wire.

After drying, wire 36 with its attached mass 56 is introduced carefully into tube 34 until mass 56 is adjacent the interior wall of the membrane at end 28, as shown in FIG. 3C. End 28 is now heated in the same manner as heretofore described in connection with the steps resulting in the structure shown in FIG. 2F, and with similar results in that spongy AgCl fuses, forming the requisite integral mass between the membrane and the wire. Upon cooling, the fused silver chloride will be found to have bonded to and between the membrane and wire, thus achieving the essential structure of the electrode shown in FIG. 2F. The electrode structure shown in FIG. 2F, may, if it is desired to provide additional mechanical strength for example, be filled or potted in the open interior space 60, with any one of several known types of potting materials which are electrically insulating. However, this step is not necessary, and may be dispensed with in instances where the electrode is so small as to make the introduction of potting compound thereinto difficult.

The transition region created between the solid electrolyte and the ion-sensitive glass by the manufacturing proceses heretofore described, is believed to provide a bond which allows ionic transfer of mobile ions therethrough. Particularly, when using AgCl this bond has been found to be extremely tenacious. Electrode structure formed according to the manufacturing processes of the invention exhibit remarkable stability; for example, when immersed in a test solution of 0.1 M NaCl and showing an E.M.F. of −143 millivolts, a drift occurred of less than 0.2 millivolt in runs in excess of 4 hours.

It will be apparent that positional changes of an operating electrode will have no effect upon the potentials developed across the glass membrane due to changes in the position of the electrolyte with respect to the glass, as would occur with a liquid electrolyte. Further, by the technique just described, the amount of solid electrolyte employed can be controlled with high precision, and the area of glass to which the electrolyte is bonded can thus be equally precisely controlled. It will be appreciated that the exterior surface of the glass membrane which is congruent with the interior glass surface bonded to the electrolyte, constitutes the only ion-sensitive portion of the electrode structure of FIG. 2F.

In copending U.S. application Serial No. 259,947 filed February 20, 1963, for "Electrochemical Apparatus," by John H. Riseman et al., there is described a microelectrode which employs a solid fused electrolyte. While the microelectrode described in said application has proved quite satisfactory for many purposes, in the structure and method of forming such electrode, the amount of electrolyte, the size of the glass electrolyte contact area and the nature of the sealed electrode end wall are not readily susceptible of accurate control. Where, as in the electrode assembly shown in FIG. 1, the location and nature of the sensitive areas are of extreme importance as will be described hereinafter, electrodes of the type shown in FIG. 2F are greatly preferred.

In describing the operation of a glass microelectrode, such as that shown in FIG. 2F, formed according to either of the alternative processes of the present invention and as used in the structure illustrated in FIG. 1, certain advantages of both the glass electrode per se and the electrode assembly of FIG. 1 will become apparent. The assembly shown in FIG. 1 is primarily intended for use in determining the concentration of a first species of ion in an environment having a known and preferably substantially constant concentration of a second ionic species. Typically, such a environment exists in mammalian blood. For instance, it is known that the sodium ion concentration in human blood is comparatively constant, i.e., the total range between maximum and minimum concentrations under normal circumstances is about 0.06 pNa unit. Consequently, if it is desired to measure the concentration of another ionic species, for instance hydrogen ions, at least end 28 of electrode 22 is formed of a sodium-ion-sensitive glass, whilst electrode 24 has at least end 30 thereof formed of hydrogen-ion-sensitive glass. It will then be appreciated that the potential at electrode 22 in operation, will be relatively constant and electrode 22 can be employed as the reference electrode in place of, for instance, the standard calomel electrode. When the sodium electrode is thus used as a reference electrode, the resulting uncertainty of the pH measurement is about ±0.03 pH. The two electrodes, which are physically separated, are electrically connected to one another inasmuch as both wires 36 thereof are coupled to the respective input terminals of a suitable device (not shown) well known in the art. The output of the electrode assembly of FIG. 1, as measured on such device, is actually a measurement of the ratio of pH to pNa but because of the small variations in the latter quantity, can be readily calibrated in terms of pH alone. When formed as microelectrodes, as for long-term monitoring of ion concentration in a body fluid, electrodes 22 and 24, as hereinbefore described, are sealed in a mass of insulating material in particular relation within tube 26 wherein the ion-sensitive end membranes of both electrodes are at one surface of the mass of material. This structure allows the operator to insert the empty hypodermic needle 20 so that the pointed end thereof is within the desired fluid environment, and the operator may then insert tube 26 into the cannula of the needle. Stop means (not shown) of known construction can be employed to provide exact positioning of tube 26 within the needle so that ends 28 and 30 are finally disposed immediately adjacent the open or pointed end of the needle and in contact with the fluid environment. The electrode wires 36 then extend back into the needle interior and are available for coupling through the hub end of the needle. The structure thus described allows the operator to determine the exact positioning of the needle without interference initially from the electrodes, and permits the emplacement of the needle without endangering the fragile electrode ends during the emplacement operation. The entire structure shown in FIG. 1 basically is formed of two units of very simple shape, the needle and the electrode-tube assembly, hence can readily be rendered sterile, easily maintained in a sterile condition prior to use, and assembled with a minimum of effort. The use of solid internal electrolyte in both glass electrodes insures excellent positional stability, and a great improvement in reliability inasmuch as there is no liquid-liquid junction with its problems of clotting and environmental fluid diffusion. Particularly, because of the precise delineation of sensitive areas and the limitation thereof to the electrode tips according to the process of the present invention, the electrode assembly can be formed in an extremely compact and advantageous shape. The maintenance of a thin wall structure for the ion-sensitive sealed electrode ends or membrane confers excellent response time upon assemblies formed with such electrodes.

Further, a certain amount of surface hydration of the glass of an electrode occurs if the latter is maintained in contact with an aqueous environment for any protracted period of time, such as several days or even hours. The hydration layers formed on the surface are, in effect, low resistance paths, and will tend to spread even through the interface between the glass tube and potting material. If the solid electrolyte mass were also bonded to a portion of the interior of tube 34 opposite a potting material-glass interface, the effect of the spread of the hydration layer would be to increase the ion-sensitive area exposed to the test environment. Thus, over a period of time, there would occur spurious drifts similar to the immersion sensitivity errors in glass electrodes using liquid electrolytes. By limiting, according to the process of the present invention, the ion-sensitive portion of the electrode to a prescribed area of the internal surface of the tip, it is possible to have the corresponding external surface of the tip entirely in contact with the environment; thus, the occurrence of hydration layers at the potting material-electrode interface will not serve to increase the ion-sensitive area of the electrode. This allows the entire tube used to make the electrode to be formed of ion-sensitive glass, although only a limited portion thereof will exhibit actual sensitivity.

Since certain changes may be made in the above apparatus and method without departing from the scope of the invention herein involved, it is intended that all matter contained in the above description or shown in the accompanying drawing shall be interpreted as illustrative and not in a limiting sense.

What is claimed is:
1. An electrode assembly for determining concentrations of a first species of ion in an environment having a concentration of a second ionic species, said assembly comprising, in combination;
    a first electrode comprising a membrane of glass preferentially sensitive to said first species and having in intimate physical and electrical contact with one surface thereof a solid, fused, electrically-conductive, integral mass of an ionic material;
    a second electrode comprising a membrane of glass preferentially sensitive to said second species, and having in intimate physical and electrical contact with one surface thereof a solid, fused, electrically-conductive, integral mass of an ionic material;
    means for disposing said electrodes so that at least portions of opposite surfaces of said membrane are adapted to contact said environment; and
    metallic, electrically-conductive leads of a metal selected from the group consisting of silver and thallium in intimate physical and electrical contact with each of said masses of ionic material, said materials being substantially a halide of the metal; and means for electrically connecting said electrodes to one another through a measuring device.

2. An electrode assembly for determining concentration of a first species of ion in an environment having a concentration of a second species of ion, said assembly comprising, in combination:
    a first substantially hollow electrode member having at least one wall portion thereof formed of a membrane of first glass preferentially sensitive to said first species, said membrane having a predetermined area of the interior surface thereof in intimate physical and electrical contact with a first solid fused, ionic mass;

a second substantially hollow electrode having at least a wall portion thereof formed of a membrane of second glass preferentially sensitive to said second species, a predetermined area of the interior surface of said membrane being in intimate physical and electrical contact with a second solid fused ionic mass;

a first electrically-conductive lead of a metal selected from the group consisting of silver and thallium in physical and electrical contact with said first solid fused mass of substantially a halide of said metal;

a second electrically-conductive lead of a metal selected from the group consisting of silver and thallium in physical and electrical contact with said second solid fused mass of substantially a halide of said metal; and means for electrically connecting said electrodes to one another through a measuring device.

3. An electrode assembly for determining concentration of a first species of ion in an environment having a substantially known concentration of a second ionic species, said assembly comprising, in combination:

a first elongated hollow electrode having one end thereof sealed with a membrane of glass preferentially sensitive to said first species, and having a mass of solid electrolyte of a halide of a metal selected from the group consisting of silver and thallium in intimate physical and electrical contact with the interior of said membrane;

a second hollow elongated electrode having one end thereof sealed with a membrane of glass preferentially sensitive to said second species, and having a second mass of solid electrolyte of a halide of said metal in intimate physical and electrical contact with the interior surface of said membrane;

first and second metallic, electrically conductive leads of said metal respectively disposed within the interiors of said first and second electrodes and in contact respectively with said first and second masses;

solid, electrically insulating material, substantially insoluble in said environment, in contact with exterior surfaces of both of said electrodes, except for said membranes, for supporting said electrodes so that said membranes may contact said environment; and means for electrically connecting said electrodes to one another through a measuring device.

4. An electrode assembly for determining concentrations of a first species of ion in an environment having a concentration of a second ionic species, said assembly comprising, in combination:

a mass of electrically-insulating material, substantially insoluble in said environment and having embedded therein at least a pair of electrodes;

a first of said electrodes comprising a membrane of glass preferentially sensitive to said first species and having in intimate physical and electrical contact with one surface thereof a solid, fused, electrically-conductive, integral mass of substantially a halide of a metal selected from the group consisting of silver and thallium;

a second of said electrodes comprising a membrane of glass preferentially sensitive to said second species, and having in intimate physical and electrical contact with one surface thereof a solid, fused, electrically-conductive, integral mass of substantially a halide of said metal at least a respective portion of each of the opposite surfaces of said membrane being free of said insulating material, adjacent one another substantially at a common surface of said mass of insulating material, and adapted to contact said environment;

first and second metallic, electrically-conductive leads of said metal respectively in contact with the masses of ionic material contacting said first and second electrodes; and means for electrically connecting said electrodes to one another through a measuring device.

5. An electrode assembly as defined in claim 4 wherein said assembly is so shaped and dimensioned as to releasably fit within the cannula of a hypodermic needle, such that said membrane portions are disposed adjacent the pointed end of said needle and said leads extend within said needle toward the hub end thereof.

6. An electrode assembly as defined in claim 4 wherein said membrane of said first electrode is glass preferentially sensitive to sodium ions, and said membrane of said second electrode is glass preferentially sensitive to some other ion.

7. Process for making an electrode structure for measuring ion-concentration, said process comprising the steps of:

forming a hollow member having as a wall portion thereof a membrane of ion-sensitive glass, and having an opening into the interior thereof;

disposing in said interior adjacent said membrane an elongated, electrically conductive, metallic wire of silver or thallium and a predetermined mass of a halide of said metal adherent to said wire;

heating said mass to a molten state in contact with said membrane; and cooling said mass to a solid in intimate physical and electrical contact with both said wire and said membrane.

8. Process for making an electrode structure for measuring ion-concentration, said process comprising the steps of:

drawing a heated portion of a tube of ion-sensitive glass so that the internal and external diameters of said tube at said heated portion are reduced;

dividing the drawn portion of said tube at a point where the external diameter thereof has been reduced by approximately one-third to one-half of the original diameter, to form a tube part having no diameters less than the diameters at the point of division;

heating the divided end of said tube part to form a seal at said end with a glass wall having a thickness of approximately the same order as the side walls of said tube part adjacent said end;

disposing inside said tube part adjacent said wall, an elongated, electrically-conductive metallic wire of silver or thallium, and a predetermined mass of a salt of the metal of said wire adherent to said wire;

heating said mass to a molten state in contact with said membrane; and cooling said mass to a solid in intimate physical and electrical contact with both said wire and said membrane.

9. Process for making an electrode structure for measuring ion-concentration, said process comprising the steps of:

forming a membrane of ion-sensitive glass as a seal at one end of a tube of said glass, said membrane having a thickness of approximately the same order of thickness as the walls of said tube adjacent said seal;

forming from a normally solid, ionic material of a halide of a metal selected from the group consisting of silver and thallium a plurality of fused globules having diameters less than the internal diameter of said tube;

introducing a predetermined number of selected globules and an elongated, electrically-conductive wire of said metal into said tube adjacent said membrane;

heating said globules to form a continuous molten mass in contact with both said wire and said membrane; and cooling said tube to solidify said mass in intimate physical and electrical contact with both said wire and said membrane.

10. Process as defined in claim 9 wherein said material in its solid state has a bulk resistivity of at least an order of magnitude less than the bulk resistivity of said glass and mobile cations having a diffusion coefficient in said material of an order not less than the diffusion coefficient of the normally mobile ions in said glass.

11. Process for making an electrode structure for measuring ion-concentration, said process comprising the steps of:

treating an end portion of an elongated metallic electrically-conductive wire of silver or thallium to form a predetermined mass of a solid, halide salt thereof adherent to said wire;

introducing said wire and said mass thereon within a tube adjacent to an ion sensitive glass membrane;

heating said mass to a molten state in contact with both said wire and said membrane; and cooling said tube to solidify said mass in intimate physical and electrical contact with both said wire and said membrane.

12. Process for making an electrode structure for measuring ion-concentration, said process comprising the steps of:

forming a membrane of ion-sensitive glass as a seal at one end of a tube of said glass, said membrane having a thickness of approximately the same order of thickness as the walls of said tube adjacent said seal;

electrolyzing an end portion of an elongated metallic silver wire to form a predetermined mass of a normally solid halide salt thereof adherent to said wire;

introducing said wire and said mass thereon within said tube adjacent said membrane;

heating said mass to a molten state in contact with both said wire and said membrane; and cooling said tube to solidify said mass in intimate physical and electrical contact with both said wire and said membrane.

13. Process for making an electrode structure for measuring ion-concentration, said process comprising the steps of:

forming a hollow member having as a wall portion thereof a membrane of ion-sensitive glass, and having an opening into the interior thereof;

disposing in said interior adjacent said membrane an elongated, electrically conductive, metallic wire of silver or thallium, and a predetermined mass of a halide of said metal in the form of independent fused globules;

heating said mass to a molten state in contact with said membrane; and cooling said mass to a solid in intimate physical and electrical contact with both said wire and said membrane.

References Cited by the Examiner

UNITED STATES PATENTS

| | | | |
|---|---|---|---|
| 2,697,070 | 12/1954 | Arthur | 204—195.1 |
| 3,151,052 | 9/1964 | Arthur et al. | 204—195 |
| 3,211,640 | 10/1965 | Leonard et al. | 204—195.1 |

FOREIGN PATENTS 556,649  10/1943  Great Britain.

OTHER REFERENCES

Ives et al.: "Reference Electrodes," 1961, Academic Press, New York and London, pp. 261–263, 540, 553 and 554.

JOHN H. MACK, *Primary Examiner.*

T. TUNG, *Assistant Examiner.*